US011714171B2

United States Patent
Droz et al.

(10) Patent No.: US 11,714,171 B2
(45) Date of Patent: *Aug. 1, 2023

(54) ARRAY OF WAVEGUIDE DIFFUSERS FOR LIGHT DETECTION USING AN APERTURE AND A GIVEN TOTAL INTERNAL REFLECTION WAVEGUIDE

(71) Applicant: Waymo LLC, Mountain View, CA (US)

(72) Inventors: Pierre-Yves Droz, Los Altos, CA (US); David Hutchison, Santa Clara, CA (US)

(73) Assignee: Waymo LLC, Mountain View, CA (US)

(*) Notice: Subject to any disclaimer, the term of this patent is extended or adjusted under 35 U.S.C. 154(b) by 555 days.

This patent is subject to a terminal disclaimer.

(21) Appl. No.: 16/830,680

(22) Filed: Mar. 26, 2020

(65) Prior Publication Data

US 2020/0225410 A1 Jul. 16, 2020

Related U.S. Application Data

(63) Continuation of application No. 15/366,746, filed on Dec. 1, 2016, now Pat. No. 10,605,984.

(51) Int. Cl.
*G02B 6/10* (2006.01)
*G01S 7/4863* (2020.01)
(Continued)

(52) U.S. Cl.
CPC .......... *G01S 7/4863* (2013.01); *G01S 7/4813* (2013.01); *G01S 7/4816* (2013.01); *G01S 7/4818* (2013.01);
(Continued)

(58) Field of Classification Search
CPC .......... G01S 17/88; G01S 17/89; G01S 17/00; G01S 17/04; G01S 17/06; G01S 7/48;
(Continued)

(56) References Cited

U.S. PATENT DOCUMENTS 3,899,145 A 8/1975 Stephenson
4,212,516 A * 7/1980 Sawamura ............. G02B 26/10
385/115

(Continued)

FOREIGN PATENT DOCUMENTS

EP 2910969 A1 8/2015
JP 2015-161683 A 9/2015
(Continued)

OTHER PUBLICATIONS

International Search Report and Written Opinion dated Mar. 22, 2018 for PCT/US2017/064104.
(Continued)

*Primary Examiner* — Que Tan Le
(74) *Attorney, Agent, or Firm* — McDonnell Boehnen Hulbert & Berghoff LLP

(57) ABSTRACT

The present disclosure relates to limitation of noise on light detectors using an aperture. One example implementation includes a system. The system includes a lens that focuses light from a scene toward a focal plane. The system also includes an aperture defined within an opaque material. The system also includes a plurality of waveguides. A given waveguide of the plurality has an input end that receives a portion of light transmitted through the aperture, and guides the received portion toward an output end of the given waveguide. A cross-sectional area of the guided portion at the output end is greater than a cross-sectional area of the received portion at the input end. The system also includes
(Continued)

an array of light detectors that detects the guided light transmitted through the output end.

20 Claims, 6 Drawing Sheets

(51) Int. Cl.
    *G02B 19/00*     (2006.01)
    *G01S 17/89*     (2020.01)
    *G02B 27/09*     (2006.01)
    *G01S 7/481*     (2006.01)
    *G01S 17/00*     (2020.01)
    *G02B 5/00*     (2006.01)
    *G02B 6/08*     (2006.01)

(52) U.S. Cl.
    CPC .............. *G01S 17/00* (2013.01); *G01S 17/89* (2013.01); *G02B 5/003* (2013.01); *G02B 5/005* (2013.01); *G02B 6/08* (2013.01); *G02B 19/0014* (2013.01); *G02B 19/0076* (2013.01); *G02B 27/0994* (2013.01)

(58) Field of Classification Search
    CPC .......... G02B 19/00; G02B 27/09; G02B 6/06; G02B 6/08; G02B 6/10; G02B 6/00
    USPC ..................................... 250/221, 216, 227.11
    See application file for complete search history.

(56) References Cited

U.S. PATENT DOCUMENTS

| | | | |
|---|---|---|---|
| 4,544,255 A | 10/1985 | Utagawa | |
| 5,159,412 A | 10/1992 | Willenborg et al. | |
| 5,391,869 A | 2/1995 | Ade et al. | |
| 5,608,833 A | 3/1997 | Au et al. | |
| 5,764,842 A | 6/1998 | Aoki et al. | |
| 6,584,052 B1 | 6/2003 | Philips et al. | |
| 7,995,875 B2 | 8/2011 | Yasuda et al. | |
| 8,190,030 B2 | 5/2012 | Leclair et al. | |
| 9,256,007 B2 | 2/2016 | Vasylyev | |
| 9,285,464 B2 | 3/2016 | Pennecot et al. | |
| 9,322,992 B2 | 4/2016 | Woodward et al. | |
| 9,360,554 B2 | 6/2016 | Retterath et al. | |
| 9,405,066 B2 | 8/2016 | Mahgerefteh et al. | |
| 9,575,341 B2 | 2/2017 | Heck et al. | |
| 9,992,477 B2 | 6/2018 | Pacala et al. | |
| 10,267,970 B2 | 4/2019 | Jones, Jr. et al. | |
| 10,605,984 B2 | 3/2020 | Droz et al. | |
| 2002/0009262 A1 | 1/2002 | Kasama et al. | |
| 2004/0178329 A1 | 9/2004 | Kare et al. | |
| 2004/0184502 A1 | 9/2004 | Miyachi et al. | |
| 2004/0218869 A1 | 11/2004 | Takahashi | |
| 2004/0232430 A1 | 11/2004 | Lempkowski et al. | |
| 2005/0141808 A1 | 6/2005 | Cheben et al. | |
| 2009/0147239 A1 | 6/2009 | Zhu et al. | |
| 2011/0136063 A1 | 6/2011 | Nottola et al. | |
| 2014/0168631 A1 | 6/2014 | Haslim et al. | |
| 2015/0185313 A1 | 7/2015 | Zhu | |
| 2015/0219834 A1 | 8/2015 | Nichol et al. | |
| 2016/0154165 A1 | 6/2016 | Grot et al. | |
| 2016/0259038 A1 | 9/2016 | Retterath et al. | |
| 2016/0363669 A1 | 12/2016 | Liu | |
| 2017/0223249 A1 | 8/2017 | Tillotson et al. | |
| 2017/0370676 A1 | 12/2017 | Volfson et al. | |
| 2018/0045886 A1 | 2/2018 | Demaray | |
| 2018/0149815 A1 | 5/2018 | Heroux et al. | |
| 2018/0239096 A1 | 8/2018 | Houbertz et al. | |
| 2018/0335628 A1 | 11/2018 | Hung et al. | |
| 2019/0017938 A1 | 1/2019 | Holzapfel et al. | |
| 2019/0227147 A1 | 7/2019 | Lin et al. | |

FOREIGN PATENT DOCUMENTS

| | | |
|---|---|---|
| WO | 03/098263 A2 | 11/2003 |
| WO | 2006/064500 A2 | 6/2006 |
| WO | 2007/046100 A2 | 4/2007 |
| WO | 2017112416 A1 | 6/2017 |

OTHER PUBLICATIONS

Jurgen Van Erps, Lawrence Bogart, Bart Volckaerts, Christof Debaes, Hugo Thienpont, "Prototyping micro-optical components with integrated out-of-plane coupling structures using deep lithography with protons," Proc. SPIE 6185, Micro-Optics, VCSELs, and Photonic Interconnects II: Fabrication, Packaging, and Integration, 618504 (Apr. 21, 2006).

\* cited by examiner

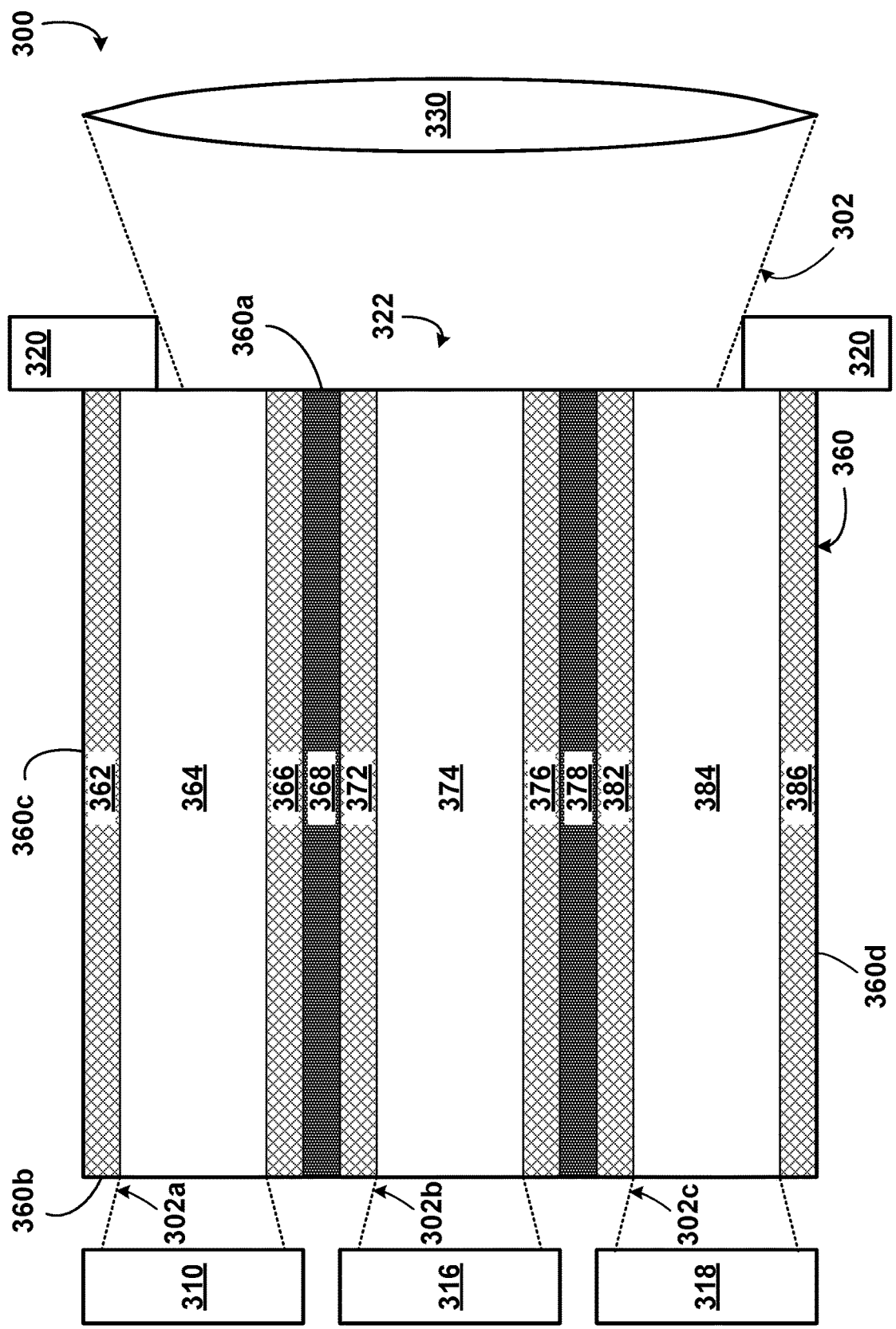

US 11,714,171 B2

ARRAY OF WAVEGUIDE DIFFUSERS FOR LIGHT DETECTION USING AN APERTURE AND A GIVEN TOTAL INTERNAL REFLECTION WAVEGUIDE

CROSS-REFERENCE TO RELATED APPLICATIONS

This application is a continuation of U.S. application Ser. No. 15/366,746, filed Dec. 1, 2016, which is incorporated herein by reference.

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, corresponding to an intensity of the light). Many types of such devices are fabricated out of semiconducting materials, such as silicon. In order to detect light over a substantial geometric area, multiple light detectors can be arranged into arrays connected in parallel. These arrays are sometimes referred to as silicon photomultipliers (SiPMs) or multi-pixel photon counters (MPPCs).

Some of the above arrangements are sensitive to relatively low intensities of light, thereby enhancing their detection qualities. However, this can lead to the above arrangements also being disproportionately susceptible to adverse background effects (e.g., extraneous light from outside sources could affect a measurement by the light detectors).

SUMMARY

In one example, a system includes a lens disposed relative to a scene and configured to focus light from the scene toward a focal plane of the lens. The system also includes an aperture defined within an opaque material disposed parallel to the focal plane of the lens. The system also includes a plurality of waveguides including a given waveguide. The given waveguide has an input end that receives a portion of light transmitted through the aperture. The given waveguide guides the received portion of the light for transmission through an output end of the given waveguide. A cross-sectional area of the guided light at the output end is greater than a cross-sectional area of the received portion of the light at the input end. The system also includes an array of light detectors that detects the guided light transmitted through the output end.

In another example, a method involves focusing, by a lens disposed relative to a scene, light from the scene toward a focal plane. The method also involves transmitting, through an aperture defined within an opaque material disposed parallel to the focal plane, the focused light from the scene. The method also involves receiving, at an input end of a given waveguide of a plurality of waveguides, a portion of the light transmitted through the aperture. The method also involves guiding, by the given waveguide, the received portion of the light toward an output end of the given waveguide. The method also involves detecting, at an array of light detectors, the guided light propagating out of the output end. A cross-sectional area of the detected light is greater than a cross-sectional area of the portion of the light received at the input end.

In yet another example, a light detection and ranging (LIDAR) device includes a LIDAR transmitter that illuminates a scene. The LIDAR device also includes a LIDAR receiver that receives light scattered by one or more objects within the scene. The LIDAR receiver includes a lens that focuses the received light toward a focal plane. The LIDAR receiver also includes an aperture defined within an opaque material disposed parallel to the focal plane. The LIDAR receiver also includes a plurality of waveguides. A given waveguide of the plurality has an input end that receives a portion of light transmitted through the aperture. The given waveguide guides the received portion of the light toward an output end of the given waveguide. The LIDAR receiver also includes an array of light detectors that intercepts and detects the guided light transmitted through the output end. A cross-sectional area of a detection region of the array that intercepts the guided light transmitted through the output end is greater than a cross-sectional area of the received portion of the light at the input end.

In still another example, a system comprises means for focusing light from a scene toward a focal plane. The system also comprises means for transmitting, through an aperture defined within an opaque material disposed at the focal plane, the focused light from the scene. The system also comprises means for receiving, at an input end of a given waveguide of a plurality of waveguides, a portion of the light transmitted through the aperture. The system also comprises means for guiding, by the given waveguide, the received portion of the light toward an output end of the given waveguide. The system also comprises means for detecting, at an array of light detectors, the guided light propagating out of the output end. A cross-sectional area of the detected light is greater than a cross-sectional area of the portion of the light received at the input end.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3B illustrates a cross-section view of the system in FIG. 3A, according to example embodiments.

DETAILED DESCRIPTION

Figure 1A:
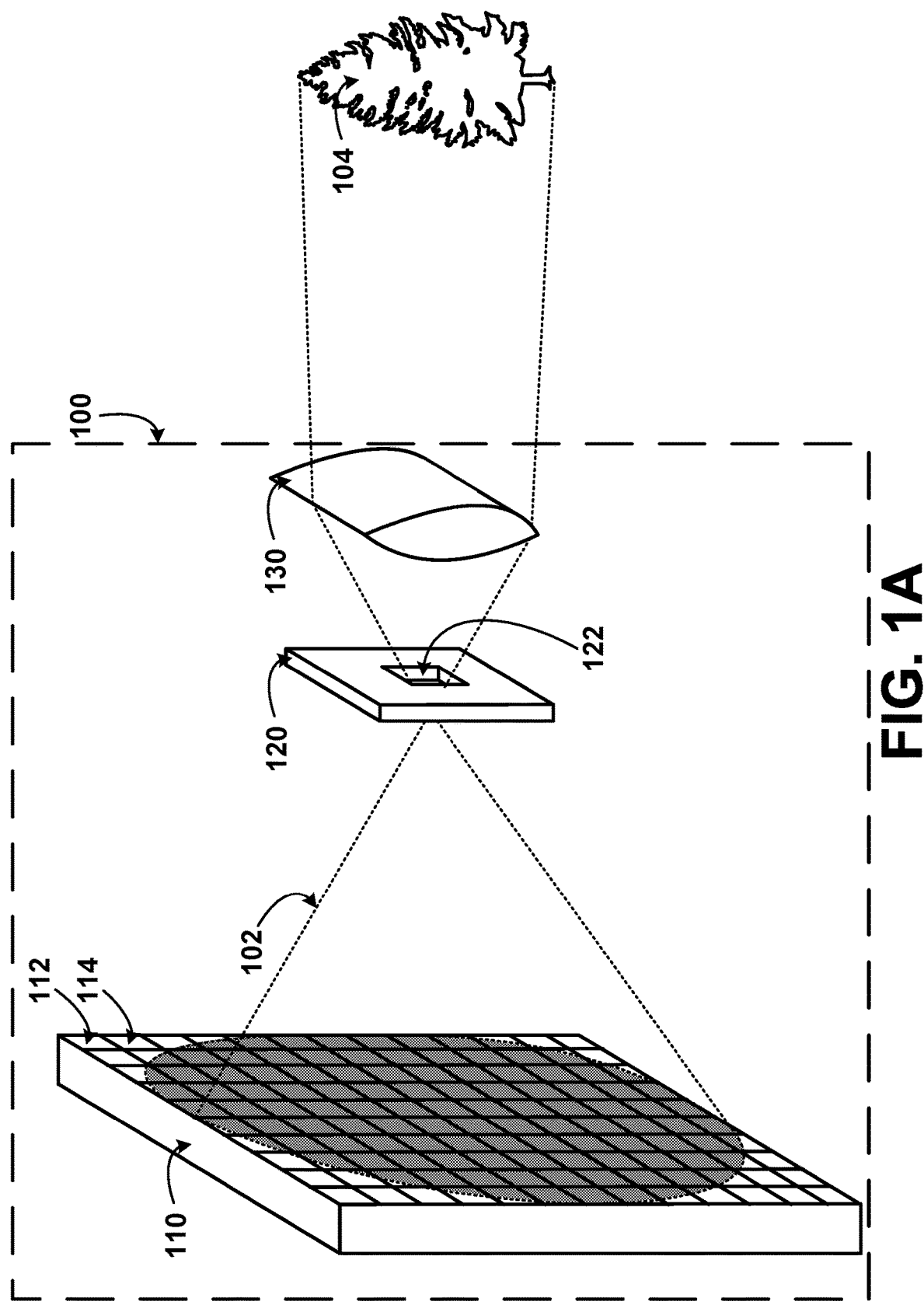
FIG. 1A is an illustration of a noise limiting system that includes an aperture, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. Overview

Example implementations may relate to devices, systems, and methods for reducing background light imparted onto an array of light detectors. The light detectors in the array may be sensing light from a scene. For example, the light detectors may be a sensing component of a light detection and ranging (LIDAR) device.

One example system includes a lens. The lens may be used to focus light from a scene toward a focal plane. However, the lens may also focus background light not intended to be observed by the system (e.g., sunlight within the scene). In order to selectively filter the light (i.e., separate background light from light corresponding to information within the scene), an opaque material (e.g., selectively etched metal, a glass substrate partially covered by a mask) may be placed behind the lens. The opaque material could be shaped as a slab, a sheet, or various other shapes in a variety of embodiments. Within the opaque material, an aperture may be defined. The aperture may select a region of, or the entirety of, the light of the scene focused by the lens toward the opaque material.

On a backside of the opaque material (i.e., a side of the opaque material opposite the lens), the light selected by the aperture may be transmitted through the aperture. In the direction of the light transmitted through the aperture, the system may include a plurality of adjacent waveguides in a linear arrangement. Each waveguide can have an input end adjacent to the aperture, and an output end opposite to the input end (e.g., at a greater distance to the aperture). Further, for each waveguide, the system may also include an array of light detectors (e.g., SPADs) disposed along the output end of the waveguide. This array of light detectors may detect a portion of the light (e.g., a light intensity thereof) guided through the waveguide toward the output end. Because the light diverges inside the waveguide, the number of light detectors able to fit into a detection area (e.g., detectors that intercept light transmitted through the output end of the waveguide) can be larger than could fit in a detection area corresponding to a portion of the aperture from which a portion of the light is transmitted into the input end of the waveguide. This is due to the detection area being more focused, and thus smaller, at the aperture than at a distance displaced from the aperture.

Further, in some implementations, the plurality of waveguides can be configured to control divergence of guided light such that the divergence happens along one direction (e.g., perpendicular to a long axis of the aperture) more than another direction (e.g., parallel to the long axis of the aperture). By way of example, consider an aperture having a cross-sectional area of 2000 μm (long axis) by 200 μm (short axis). In this example, the plurality of waveguides can be implemented as 10 stacked waveguides, each having a length (along the long axis of the aperture) of 200 μm. In this example, the portion of the light entering the input end of a waveguide may have a cross-sectional area of 200 μm by 200 μm, which may be suitable to accommodate hundreds of SPADs (e.g., each SPAD having a cross-sectional area between 200 $\mu m^2$ and 600 $\mu m^2$). By comparison, after the guided light diverges inside the waveguide and exits through the output end, the cross-sectional area of the guided light at the output end may be larger depending on the dimensions of the waveguide for instance, and may thus accommodate thousands or more SPADs. Further, in some examples, the array of SPADs can be connected in parallel to one another, which may allow combining the signals from the connected SPADs to improve the sensitivity of the system (e.g., increase the combined detection area of the SPADs).

Additionally, with this arrangement, a first array of light detectors coupled to a first waveguide may receive light transmitted through a first portion of the aperture, and a second array of light detectors coupled to a second waveguide may receive light through a second portion of the aperture. As a result, the system can determine a one-dimensional (1D) image of the scene, while still allowing for a larger detection area relative to the size of the aperture. For example, each array of light detectors can be connected in parallel to provide a combined output that represents a single image pixel of the scene.

Without the waveguides, for example, the portions of the light transmitted through the aperture may diverge and overlap prior to arriving at the array of light detectors. Whereas, with the plurality of waveguides, each waveguide can limit divergence of a portion of the light guided therein such that the guided portion does not overlap another guided portion of the light inside an adjacent waveguide. As a result, each array of light detectors can receive guided light that corresponds to a respective portion of the aperture regardless of the proximity of the portions of the aperture or the distance between the aperture and the respective arrays of light detectors. Additionally or alternatively, the system can detect light transmitted through multiple proximally arranged apertures (or portions of a single aperture) simultaneously to generate a 1D or 2D image of the scene, regardless of the distance between the apertures or the distance between a light detector array and an aperture.

In some examples, the plurality of waveguides can be implemented as a plurality of glass plates stacked adjacent to the aperture. With this arrangement, light transmitted through a portion of the aperture adjacent to a glass plate could propagate through the glass plate. For example, the stacked glass plates can be separated by low index of refraction materials (e.g., a polymer coating, fluorine-doped glass, etc.) to reduce divergence of guided light therein in a direction of an adjacent waveguide (e.g., via total internal reflection, etc.), while allowing divergence of the guided light in another (e.g., perpendicular) direction.

In some implementations, the system may also include an absorber (e.g., carbon black) positioned between adjacent waveguides to prevent guided light inside one waveguide from leaking into another. For example, a light absorbing layer can have a suitable thickness for absorbing evanescent light evanescing through surfaces of adjacent waveguides, and/or for absorbing light propagating inside a cladding of a waveguide (e.g., cladding modes) rather than inside a core of the waveguide.

II. Example Systems and Devices

FIG. 1A is an illustration of a noise limiting system 100 that includes an aperture, according to example embodiments. As shown, system 100 includes an array 110 of light detectors (exemplified by detectors 112 and 114), an aperture 122 defined within an opaque material 120, and a lens 130. System 100 may measure light 102 scattered by an object 104 within a scene. Light 102 may also come, at least partially, from background sources. Thus, in some examples, system 100 may be included in a light detection and ranging (LIDAR) device. For example, the LIDAR device may be used for navigation of an autonomous vehicle. Further, in some embodiments, system 100, or portions thereof, may be contained within an area that is unexposed to exterior light other than through lens 130 and/or aperture 122. This may prevent ambient light from triggering the detectors in array 110 thereby affecting measurements.

Array 110 includes an arrangement of light detectors, exemplified by detectors 112 and 114. In various embodiments, array 110 may have different shapes. As shown, array 110 has a rectangular shape. However, in other embodiments, array 110 may be circular or may have a different shape. The size of array 110 may be selected according to an expected cross-sectional area of light 110 diverging from aperture 122, and may thus be based on the distance between array 110 and aperture 122, dimensions of aperture 122, optical characteristics of lens 130, etc. In some embodiments, array 110 may be movable. For example, array 110 may be actuated closer to, or further from, aperture 122. To that end, for instance, array 110 could be mounted on an electrical stage capable of translating in one, two, or three dimensions.

Further, in some implementations, array 110 may provide one or more outputs to a computing device or logic circuitry. For example, a microprocessor-equipped computing device may receive electrical signals from array 110 which indicate an intensity of light 102 incident on array 110. The computing device may then use the electrical signals to determine information about object 104 (e.g., distance of object 104 from aperture 122, etc.). In some embodiments, some or all of the light detectors within array 110 may be interconnected with one another in parallel. To that end, for example, array 110 may be an SiPM or an MPPC, depending on the particular arrangement and type of the light detectors within array 110.

Light detectors 112, 114, etc., may include various types of light detectors. In one example, detectors 112, 114, etc. include SPADs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In another example, light detectors 112, 114, etc., may include APDs. In some instances, APDs or SPADs may be biased above an avalanche breakdown voltage. Such a biasing condition may create a positive feedback loop having a loop gain that is greater than one. Further, APDs or SPADs biased above the threshold avalanche breakdown voltage may be single photon sensitive. In other examples, light detectors 112, 114, etc., may include photoresistors, charge-coupled devices (CCDs), and/or photovoltaic cells, among others.

In some implementations, array 110 may include more than one type of light detector across the array. For example, array 110 can be configured to detect multiple predefined wavelengths of light 102. To that end, for instance, array 110 may comprise some SPADs that are sensitive to one range of wavelengths and other SPADs that are sensitive to a different range of wavelengths. In some embodiments, light detectors 110 may be sensitive to wavelengths between 400 nm and 1.6 μm (visible and infrared wavelengths). Further, light detectors 110 may have various sizes and shapes within a given embodiment or across various embodiments. In some embodiments, light detectors 112, 114, etc., may include SPADs that have package sizes that are 1%, 0.1%, or 0.01% of the area of array 110.

Opaque material 120 may block a portion of light 102 from the scene (e.g., background light) that is focused by the lens 130 from being transmitted to array 110. As such, opaque material 120 may be configured to block certain background light that could adversely affect the accuracy of a measurement performed by array 110. Opaque material 120, and therefore the aperture 122, may be positioned at or near a focal plane of the lens 130. In one example, opaque material 120 may block transmission by absorbing light 102. In another example, opaque material 120 may block transmission by reflecting light 102. A non-exhaustive list of example implementations of opaque material 120 includes an etched metal, a polymer substrate, a biaxially-oriented polyethylene terephthalate (BoPET) sheet (also referred to as a Mylar® sheet), or a glass overlaid with an opaque mask, among other possibilities.

Aperture 122 provides a port within opaque material 120 through which light 102 may be transmitted. Aperture 122 may be defined within opaque material 120 in a variety of ways. In one example, where opaque material 120 includes a metal, the metal may be etched to define aperture 122. In another example, where opaque material 120 is a glass substrate overlaid with a mask, the mask may include a gap that defines aperture 122 (e.g., via photolithography). In various embodiments, aperture 122 may be partially or wholly transparent. For example, where opaque material 120 is a glass substrate overlaid with a mask, aperture 122 may be defined as a portion of the glass substrate not covered by the mask, such that aperture 122 is not completely hollow but rather made of glass. Thus, for instance, aperture 122 may be nearly, but not entirely, transparent to one or more wavelengths of light 102 scattered by the object 104 (because most glass substrates are not 100% transparent).

Aperture 122 (in conjunction with opaque material 120) may be configured to spatially filter light 102 from the scene at the focal plane. For example, light 102 may be focused onto a focal plane along a surface opaque material 120, and aperture 122 may allow only a portion of the focused light to be transmitted to array 110. As such, aperture 122 may behave as an optical pinhole. In one embodiment, aperture 122 may have a cross-sectional area of between 0.02 mm$^2$ and 0.06 mm$^2$ (e.g., 0.04 mm$^2$). In other embodiments, aperture 122 may have a different cross-sectional area depending on various factors such as optical characteristics of lens 130, distance to array 110, noise rejection characteristics of the light detectors in array 110, etc.

Although the term "aperture" as used above with respect to aperture 122 describes a recess or hole in an opaque material through which light may be transmitted, it is noted that the term "aperture" may include a broad array of optical features. In one example, as used throughout the description and claims, the term "aperture" may additionally encompass transparent or translucent structures defined within an opaque material through which light can be partially transmitted. In another example, the term "aperture" may describe a structure that otherwise selectively limits the passage of light (e.g., through reflection or refraction), such as a mirror surrounded by an opaque material. In one example embodiment, mirror arrays surrounded by an opaque material may be arranged to reflect light in a certain direction, thereby defining a reflective portion. This reflective portion may be referred to as an "aperture".

Although aperture 122 is shown to have a rectangular shape, it is noted that aperture 122 can have a different shape, such as a round shape, circular shape, elliptical shape, among others. In some examples, aperture 122 can alternatively have an irregular shape specifically designed to account for optical aberrations within system 100. For example, a keyhole shaped aperture may assist in accounting for parallax occurring between an emitter (e.g., light source that emits light 102) and a receiver (e.g., lens 130 and array 110). The parallax may occur if the emitter and the receiver are not located at the same position, for example. Other irregular aperture shapes are also possible, such as specifically shaped apertures that correspond with particular objects expected to be within a particular scene or irregular apertures that select specific polarizations of light 102 (e.g., horizontal polarizations or vertical polarizations).

Lens 130 may focus light 102 from the scene onto the focal plane where aperture 122 is positioned. With this arrangement, the light intensity collected from the scene, at lens 130, may be focused to have a reduced cross-sectional area over which light 102 is projected (i.e., increasing the spatial power density of light 102). For example, lens 130 may include a converging lens, a biconvex lens, and/or a spherical lens, among other examples. Alternatively, lens 130 can be implemented as a consecutive set of lens positioned one after another (e.g., a biconvex lens that focuses light in a first direction and an additional biconvex lens that focuses light in a second direction). Other types of lenses and/or lens arrangements are also possible. In addition, system 100 may include other optical elements (e.g., mirrors, etc.) positioned near lens 130 to aid in focusing light 102 incident on lens 130 onto opaque material 120.

Object 104 may be any object positioned within a scene surrounding system 100. In implementations where system 100 is included in a LIDAR device, object 104 may be illuminated by a LIDAR transmitter that emits light 102 (or a portion thereof). In example embodiments where the LIDAR device is used for navigation on an autonomous vehicle, object 104 may comprise pedestrians, other vehicles, obstacles (e.g., trees), or road signs, among others.

As noted above, light 102 may be scattered by object 104, focused by lens 130, transmitted through aperture 122 in opaque material 120, and measured by light detectors in array 110. This sequence may occur (e.g., in a LIDAR device) to determine information about object 104. In some embodiments, light 102 measured by array 110 may additionally or alternatively include light scattered off multiple objects, transmitted by a transmitter of another LIDAR device, ambient light, sunlight, among other possibilities.

In addition, the wavelength(s) of light 102 used to analyze object 104 may be selected based on the types of objects expected to be within a scene and their expected distance from lens 130. For example, if an object is expected to be within the scene absorbs all incoming light of 500 nm wavelength, a wavelength other than 500 nm may be selected to illuminate object 104 and to be analyzed by system 100. The wavelength of light 102 (e.g., if transmitted by a transmitter of a LIDAR device) may be associated with a source that generates light 102. For example, if the light is generated by a diode laser, light 102 may comprise light within a wavelength range centered on 900 nm (or other wavelength of the diode laser). Thus, various types of light sources are possible for generating light 102 (e.g., an optical fiber amplifier, various types of lasers, a broadband source with a filter, etc.).

Figure 1B:
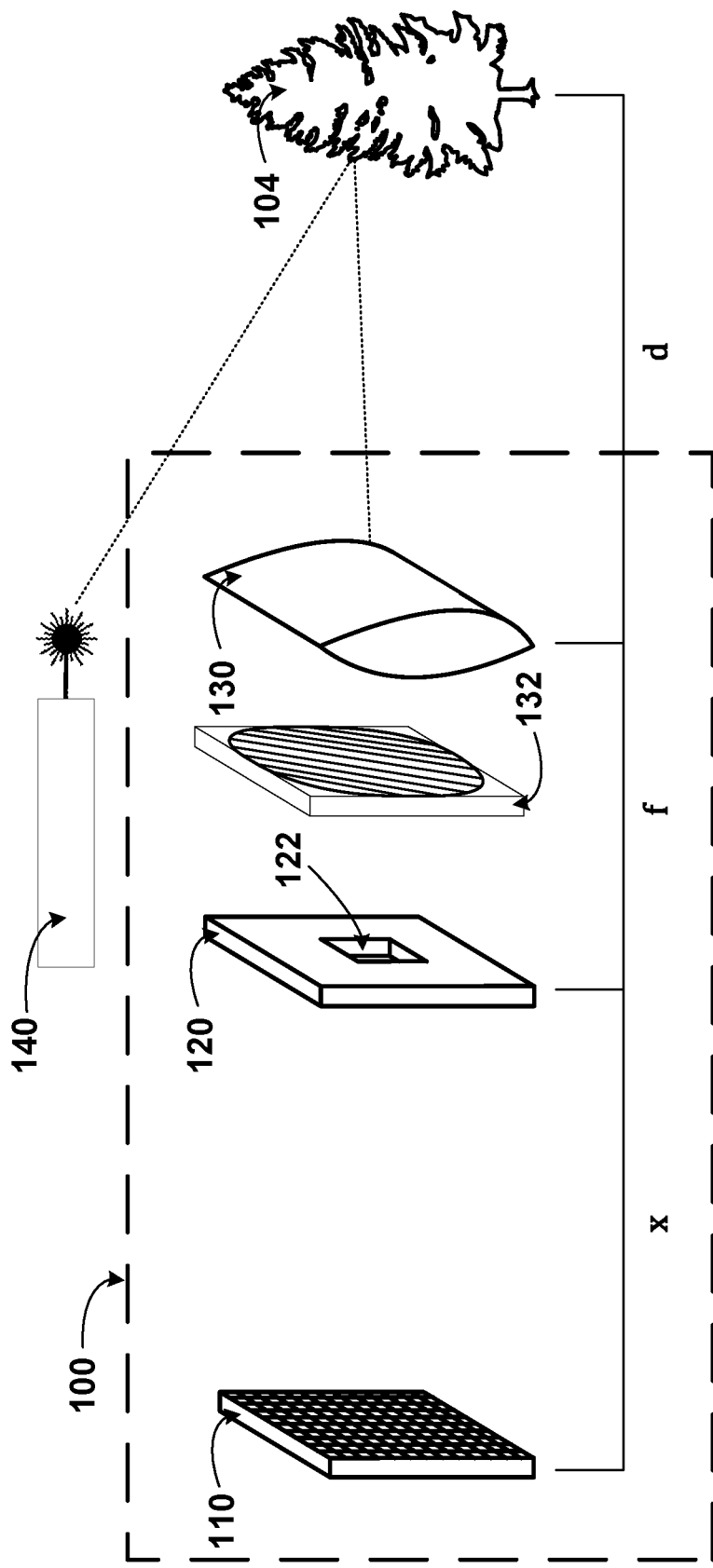
FIG. 1B is another illustration of the system in FIG. 1A, according to example embodiments.

FIG. 1B is another illustration of system 100. As shown, system 100 may also include a filter 132. Filter 132 may include any optical filter configured to selectively transmit light within a predefined wavelength range. For example, filter 132 can be configured to selectively transmit light within a visible wavelength range, an infrared wavelength range, or any other wavelength range of the light signal emitted by emitter 140. For example, optical filter 132 may be configured to divert light of particular wavelengths away from the array 110. For instance, optical filter 132 may divert a portion of light 102 that is not of the wavelength range emitted by emitter 140 away from array 110. Therefore, optical filter 132 may, at least partially, reduce ambient light or background light from adversely affecting measurements by array 110.

In various embodiments, optical filter 132 may be located in various positions relative to array 110. As shown, optical filter 132 is located between lens 130 and opaque material 120. However, optical filter 132 may alternatively be located between lens 130 and object 104, between material 120 and array 110, combined with array 110 (e.g., array 110 may have a surface screen that optical filter 132, or each of the light detectors in array 110 may individually be covered by a separate optical filter, etc.), combined with aperture 122 (e.g., aperture 122 may be transparent only to a particular wavelength range, etc.), or combined with lens 130 (e.g., surface screen disposed on lens 130, material of lens 130 transparent only to a particular wavelength range, etc.).

Further, as shown, system 100 could be used with an emitter 140 that emits a light signal to be measured by array 110. Emitter 140 may include a fiber laser, a photodiode, a filament, a LIDAR transmitter, or any other light source. As shown, emitter 140 may emit light which is scattered by object 104 in the scene and ultimately measured (at least a portion thereof) by array 110. In some embodiments, emitter 140 may be a laser emitter comprising an optical fiber amplifier or other amplifying system that increases power output of laser emitter 140. Additionally or alternatively, in some embodiments, emitter 140 may be implemented as a pulsed laser (as opposed to a continuous wave laser), allowing for increased peak power while maintaining an equivalent continuous power output.

The following is a mathematical illustration comparing the amount of background light that is received by lens 130 to the amount of signal light that is detected by the array 110. As shown, the distance between object 104 and lens 130 is 'd', the distance between lens 130 and opaque material 120 is 'f', and the distance between the opaque material 120 and the array 110 is 'x'. As noted above, material 120 and aperture 122 may be positioned at the focal plane of lens 130 (i.e., 'f' may be equivalent to the focal length). Further, as shown, emitter 140 is located at a distance 'd' from object 104.

For the sake of example, it is assumed that object 104 is fully illuminated by sunlight at normal incidence, where the sunlight represents a background light source. Further, it is assumed that all the light that illuminates object 104 is scattered according to Lambert's cosine law. In addition, it is assumed that all of the light (both background and signal) that reaches array 110 is fully detected by array 110.

The power of the signal, emitted by emitter 140, that reaches aperture 122, and thus array 110, can be calculated using the following:

$$P_{signal} = P_{tx} \times \Gamma \times \frac{A_{lens}}{\pi d^2}$$

where $P_{signal}$ represents the radiant flux (e.g., in W) of the optical signal emitted by emitter 140 that reaches array 110, $P_{tx}$ represents the power (e.g., in W) transmitted by emitter

140, Γ represents the reflectivity of object 104 (e.g., taking into account Lambert's Cosine Law), and $A_{lens}$ represents the cross-sectional area of lens 130.

The background light that reaches lens 130 can be calculated as follows:

$$\overline{P}_{background} = \frac{\overline{P}_{sun} \times T_{filter}}{\pi}$$

where $\overline{P}_{background}$ represents the radiance $$\left(\text{e.g., in } \frac{W}{m^2 \cdot sr}\right)$$

of the background light (caused by sunlight scattering off object 104) arriving on lens 130 that is within a wavelength band that will be selectively passed by filter 132, $\overline{P}_{sun}$ represents the irradiance $$\left(\text{e.g., in } \frac{W}{m^2}\right)$$

density due to the sun (i.e., the background source), and $T_{filter}$ represents the transmission coefficient of filter 132 (e.g., a bandpass optical filter). The factor of $$\frac{1}{\pi}$$

relates to the assumption of Lambertian scattering off of object 104 from normal incidence.

Aperture 122 reduces the amount of background light permitted to be transmitted to the array 110. To calculate the power of the background light that reaches array 110, after being transmitted through aperture 122, the area of aperture 122 is taken into account. The cross-sectional area ($A_{aperture}$) of aperture 122 can be calculated as follows:

$$A_{aperture} = w \times h$$

where $A_{aperture}$ represents the surface area of aperture 122 relative to object 104, and w and h represent the width and height (or length) of aperture 122, respectively. In addition, if lens 130 is a circular lens, the cross-sectional area ($A_{lens}$) of lens 130 can be calculated as follows:

$$A_{lens} = \pi \left(\frac{d_{lens}}{2}\right)^2$$

where $d_{lens}$ represents the diameter of the lens.

Thus, the background power transmitted to array 110 through aperture 122 can be calculated as follows:

$$P_{background} = \overline{P}_{background} \times \frac{A_{aperture}}{f^2} \times A_{lens}$$

where $P_{background}$ represents background power incident on array 110, and $$\frac{A_{aperture}}{f^2}$$

represents the acceptance solid angle in steradians. The above formula indicates that $P_{background}$ is the amount of radiance in the background signal after being reduced by lens 130 and aperture 122.

Substituting the above determined values in for $P_{background}$, $A_{aperture}$, $A_{lens}$ the following can be derived:

$$\overline{P}_{background} = \left(\frac{\overline{P}_{sun}T_{filter}}{\pi}\right) \times \left(\frac{wh}{f^2}\right) \times \left(\pi\left(\frac{d_{lens}}{2}\right)^2\right) = \overline{P}_{sun}T_{filter}wh\frac{d_{lens}^2}{4f^2}$$

Additionally, the quantity $$F = \frac{f}{d_{lens}}$$

may be referred to as the "F number" of lens 130. Thus, with one more substitution, the following can be deduced as the background power:

$$P_{background} = \frac{\overline{P}_{sun}T_{filter}wh}{4F^2}$$

Making similar substitutions, the following can be deduced for signal power transmitted from the emitter 140 that arrives at the array 110:

$$P_{signal} = P_{tx} \times \Gamma \times \frac{\pi\left(\frac{d_{lens}}{2}\right)^2}{\pi d^2} = \frac{P_{tx}\Gamma d_{lens}^2}{4d^2}$$

Further, a signal to noise ratio (SNR) of system 100 may be determined by comparing $P_{signal}$ with $P_{background}$. As demonstrated, the background power ($P_{background}$) may be significantly reduced with respect to the signal power due to the inclusion of aperture 122, particularly for apertures having small w and/or small h (numerator of $P_{background}$ formula above). Besides reducing aperture area, increasing the transmitted power ($P_{tx}$) by emitter 140, decreasing the transmission coefficient ($T_{filter}$) (i.e., reducing an amount of background light that gets transmitted through the filter), and increasing the reflectivity (Γ) of object 104 may be ways of increasing the SNR. Further, it is noted that in implementations where emitter 140 emits a pulsed signal, the shot noise of the background, as opposed to the power of the background, may be primarily relevant when computing the SNR. Thus, in some implementations, the SNR can be alternatively computed by comparing the shot noise against the signal power.

As shown in FIG. 1A, light 102 diverges as it propagates away from aperture 122. Due to the divergence, a detection area at array 110 (e.g., shown as shaded area illuminated by light 102) may be larger than a cross-sectional area of aperture 122 at the focal plane. An increased detection area (e.g., measured in m²) for a given light power (e.g., measured in W) may lead to a reduced light intensity (e.g., measured in $\frac{W}{m^2}$) incident on array 110.

The reduction in light intensity may be particularly beneficial in embodiments where array 110 includes SPADs or other light detectors having high sensitivities. For example, SPADs derive their sensitivity from a large reverse-bias voltage that produces avalanche breakdown within a semiconductor. This avalanche breakdown can be triggered by the absorption of a single photon, for example. Once a SPAD absorbs a single photon and the avalanche breakdown begins, the SPAD cannot detect additional photons until the SPAD is quenched (e.g., by restoring the reverse-bias voltage). The time until the SPAD is quenched may be referred to as the recovery time. If additional photons are arriving at time intervals approaching the recovery time (e.g., within a factor of ten), the SPAD may begin to saturate, and the measurements by the SPAD may thus become less reliable. By reducing the light power incident on any individual light detector (e.g., SPAD) within array 110, the light detectors (e.g., SPADs) in array 110 may remain unsaturated. As a result, the light measurements by each individual SPAD may have an increased accuracy.

Figure 2:
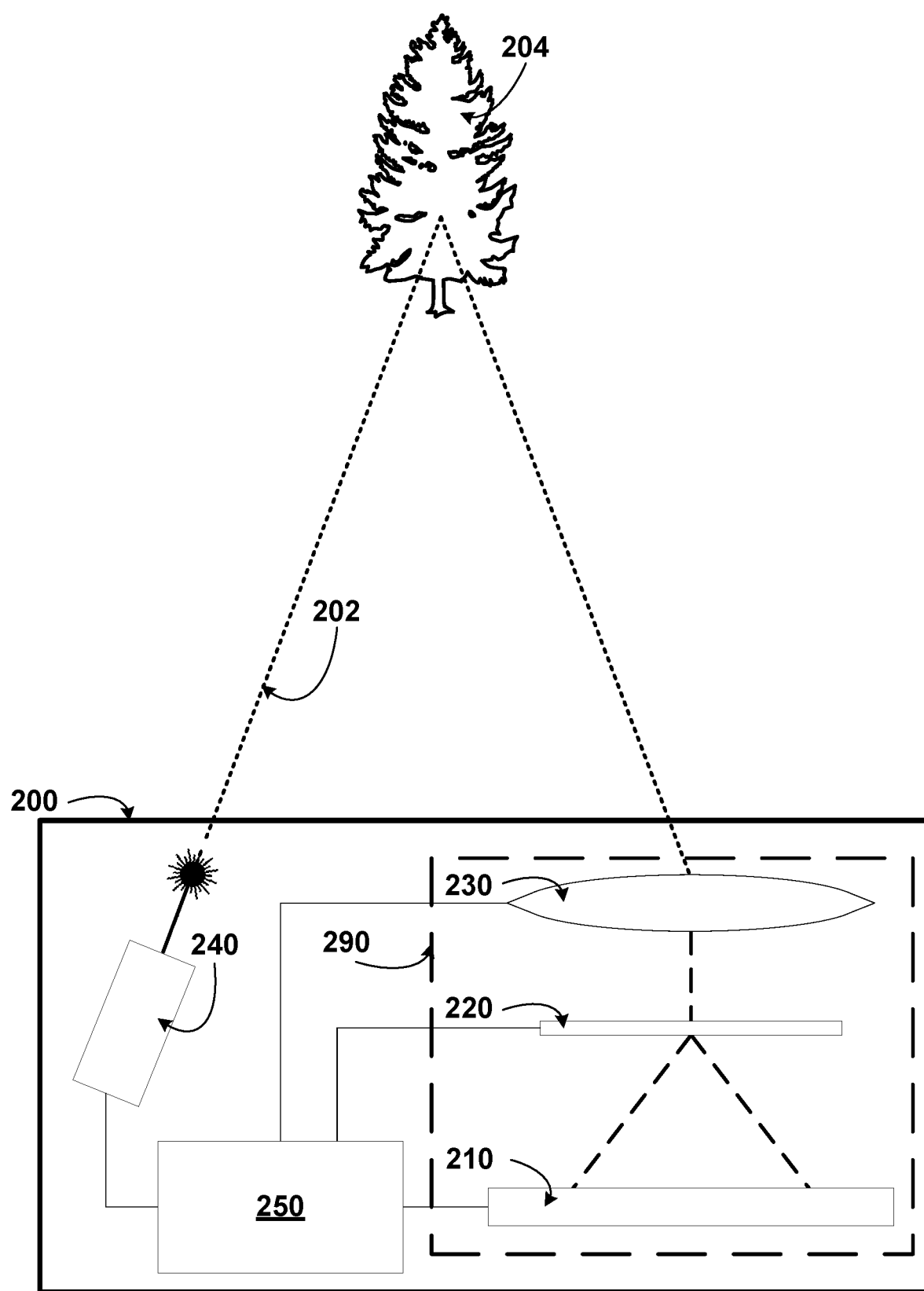
FIG. 2 is a simplified block diagram of a LIDAR device, according to example embodiments.

FIG. 2 is a simplified block diagram of a LIDAR device 200, according to example embodiments. In some example embodiments, LIDAR device 200 can be mounted to a vehicle and employed to map a surrounding environment (e.g., the scene including object 204, etc.) of the vehicle. As shown, LIDAR device 200 includes a laser emitter 240 that may be similar to emitter 140. Further, as shown, LIDAR device 200 includes a controller 250. Further, as shown, LIDAR device 200 includes a noise limiting system 290 that may be similar to system 100. For example, as shown, system 290 includes an array 210 of light detectors, an opaque material 220 with an aperture defined therein (not shown), and a lens 230, which are similar, respectively, to array 110, opaque material 120, and lens 130. It is noted that LIDAR device 200 may alternatively include more or fewer components than those shown. For example, LIDAR device 200 may include an optical filter (e.g., filter 132). Thus, system 290 can be implemented similarly to system 100 and/or any other noise limiting system described herein. Device 200 may operate emitter 240 to emit light 202 toward a scene that includes object 204. Device 200 may then detect scattered light 202 to map or otherwise determine information about object 204.

Controller 250 may be configured to control components of LIDAR device 200 and to analyze signals received from components of LIDAR device 200 (e.g., array 210 of light detectors). To that end, controller 250 may include one or more processors (e.g., a microprocessor, etc.) that execute instructions stored in a memory (not shown) of device 200 to operate device 200. Additionally or alternatively, controller 250 may include digital or analog circuitry wired to perform one or more of the various functions described herein.

In some implementations, controller 250 may use timing information associated with a signal measured by array 210 to determine a location (e.g., distance from LIDAR device 200) of object 204. For example, in embodiments where laser emitter 240 is a pulsed laser, controller 250 can monitor timings of output light pulses and compare those timings with timings of signal pulses measured by array 210. For instance, controller 250 can estimate a distance between device 200 and object 204 based on the speed of light and the time of travel of the light pulse (which can be calculated by comparing the timings). In some implementations, controller 250 may be configured to account for parallax (e.g., due to laser emitter 240 and lens 230 not being located at the same location in space). By accounting for the parallax, controller 250 can improve accuracy of the comparison between the timing of the output light pulses and the timing of the signal pulses measured by the array 210.

In some implementations, controller 250 could modulate light 202 emitted by emitter 240. For example, controller 250 could change the projection (e.g., pointing) direction of emitter 240 (e.g., by actuating a mechanical stage that mounts emitter 240). As another example, controller 250 could modulate the timing, the power, or the wavelength of light 202 emitted by emitter 240. In some implementations, controller 250 may also control other operational aspects of device 200, such as adding or removing filters (e.g., filter 132) along a path of propagation of light 202, adjusting relative positions of various components of device 200 (e.g., array 210, opaque material 220 (and an aperture therein), lens 230, etc.), among other possibilities.

In some implementations, controller 250 could also adjust an aperture (not shown) within material 220. For example, the aperture may, in some embodiments, be selectable from a number of apertures defined within the opaque material. In such embodiments, a MEMS mirror located between the lens and the opaque material may be adjustable by the computing device to determine to which of the multiple apertures the light is directed. In some embodiments, the various apertures may have different shapes and sizes. In still other embodiments, the aperture may be defined by an iris (or other type of diaphragm). The iris may be expanded or contracted by controller 250, for example, to control the size or shape of the aperture.

Through this process, LIDAR device 200 can adjust system 290 to obtain additional or different information about object 204 and/or the scene. In a first example, controller 250 may determine that background noise received by system 290 is currently relatively low (e.g., during night-time). In this example, controller 250 may increase the size of the aperture to improve the likelihood of capturing a particular scattered light pulse of light 202 that would otherwise be projected onto a region of opaque material 220 outside the aperture. In a second example, controller 250 may adjust the position of the aperture to intercept scattered light 202 reflected off a different object than object 204 or from a different region in the scene.

In some scenarios, it may be desirable to obtain the additional information described above (e.g., different aperture position, etc.) simultaneously with the information obtained using the current aperture configuration, without significantly affecting the SNR. For instance, a light pulse emitted by emitter 240 may be scattered off several objects at different distances to LIDAR device 200, and a portion of the scattered light may thus be focused, via lens 230, onto a region of opaque material 220 outside the current aperture. Therefore, referring back to FIG. 1A by way of example, it may be desirable to detect light focused onto a region adjacent to aperture 122 while simultaneously detecting light focused onto aperture 122. However, if an additional aperture is positioned adjacent to aperture 122 (or the size of aperture 122 is increased), diverging light from the additional aperture may overlap with diverging light 102 prior to arrival at array 110, thereby reducing the SNR of the detected signal.

Accordingly, example implementations are described herein for detecting light focused onto a relatively larger area along the focal plane of lens 230, while also reducing background noise and increasing the detection area where light detectors can be deployed.

Figure 3A:
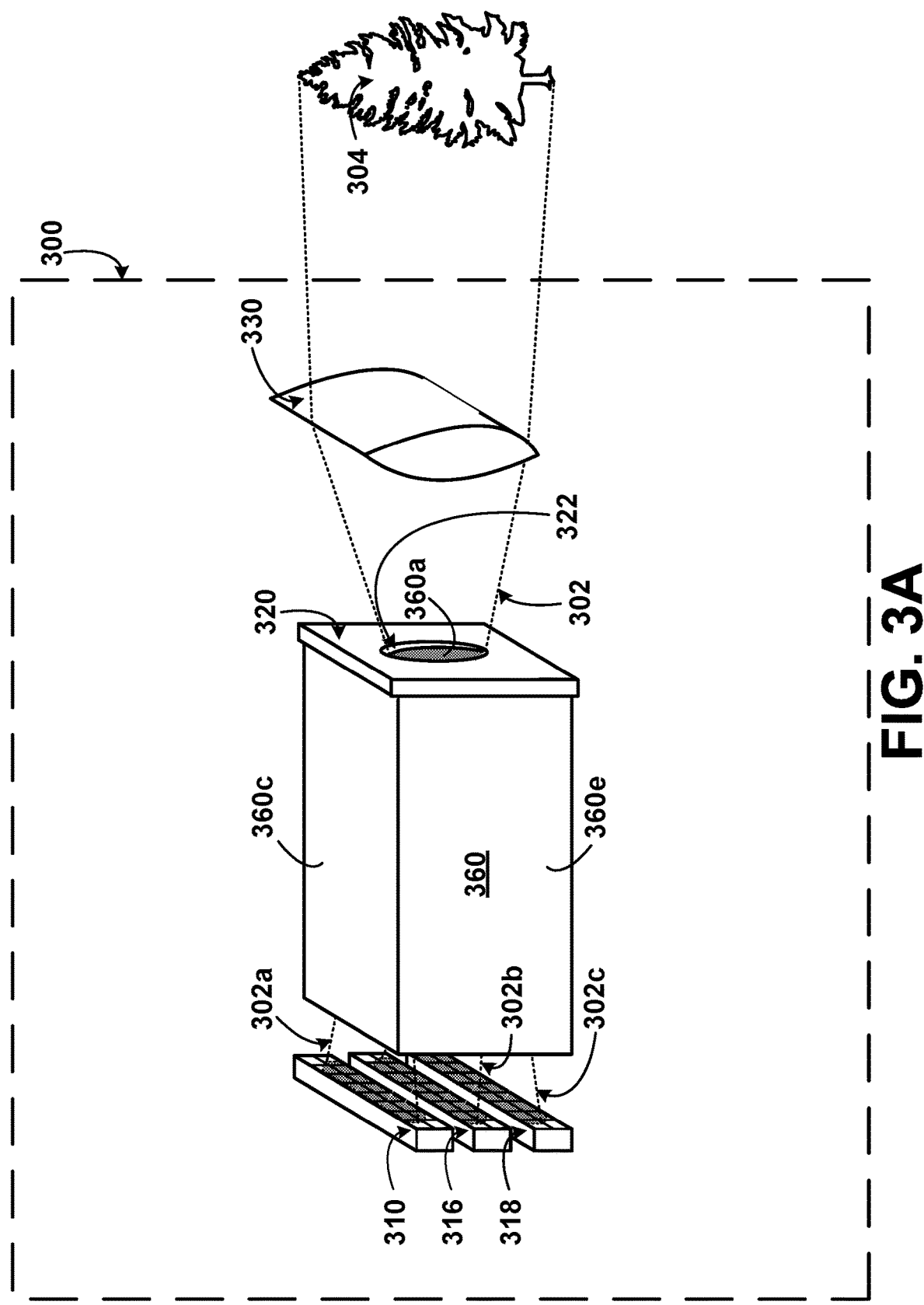
FIG. 3A is an illustration of a noise limiting system that includes an aperture and a waveguide array, according to example embodiments.

FIG. 3A is an illustration of a noise limiting system 300 that includes an aperture and a waveguide array, according to example embodiments. In some implementations, system 300 can be used with LIDAR device 200 instead of or in addition to system 290. As shown, system 300 may measure light 302 scattered by an object 304 within a scene, similarly to, respectively, system 100, light 102, and object 104.

As shown, system 300 includes light detector arrays 310, 316, and 318, each of which may be similar to light detector array 110. For example, light detector array 310 may include a plurality of light detectors, similar to detectors 112 and 114, arranged to intercept and/or detect diverging light portion 302a incident on array 310. Further, outputs from the light detectors in array 310 can be combined (e.g., parallel circuit connection, computation via controller 250, etc.) similarly to outputs of the light detectors in array 110. By combining the outputs, for instance, system 300 can increase the detection area (shown as shaded region of array 310) for detecting light 302a, as compared to a corresponding cross-sectional area of light portion 302a at aperture 322. As shown, system 300 also includes an opaque material 320, an aperture 322, and a lens 330, which may be similar, respectively, to opaque material 120, aperture 122, and lens 130. For the sake of example, aperture 322 is shown to have a different shape (elliptical) compared to a shape of aperture 122 (rectangular). As shown, system 300 also includes a waveguide array 360 interposed between aperture 322 and arrays 310, 316, 318.

Waveguide array 360 may include a plurality of waveguides (not shown) arranged to receive light 302 transmitted through aperture 322 and projected onto a receiving side 360a of array 360 (shown as shaded region of side 360a).

FIG. 3B illustrates a cross-section view of system 300, according to example embodiments. As shown, waveguide array 360 includes cladding layers 362, 366, 372, 376, 382, and 386, core layers 364, 374, and 384, and absorbing layers 368 and 378. Cladding layers 362, 366, 372, 376, 382, and 386 may comprise a relatively low index of refraction material, such as polymer coated or fluorine-doped glass substrates for instance. Core layers 364, 374, and 384 may comprise a relatively high index of refraction material, such as a glass or high-index polymer substrate for instance, that is transparent to at least some wavelengths of light 302. Absorbing layers 368 and 378 may comprise an absorber formed from any material suitable for absorbing wavelengths of light 302 guided within waveguide array 360. To that end, a non-exhaustive list of example absorbers includes carbon black, black chrome, among others.

In some examples, waveguide array 360 can be formed from a glass substrate that includes doped regions corresponding to cladding layers 362, 366, 372, 376, and 386. Thus, regions of the glass substrate that are not doped may correspond to core layers 364, 374, and 378. With this arrangement, a first waveguide of the plurality of waveguides in array 360 may comprise cladding 362, core 364, and cladding 366. Similarly, a second waveguide may comprise cladding 372, core 374, and cladding 376. Similarly, a third waveguide may comprise cladding 382, core 384, and cladding 386.

Further, each waveguide in array 360 may have a respective input end (e.g., exposed surface of respective core) along a surface of side 360a, and a respective output end (e.g., another exposed surface of respective core) along a surface of output side 360b (opposite to side 360a). Further, the waveguides in array 360 can have predefined dimensions based on the size of aperture 322, the distance between aperture 322 and lens 330, and characteristics of lens 330 (e.g., focal length), among other factors. The waveguides in array 360 may also be stacked or otherwise aligned with aperture 322 such that each waveguide receives a respective portion of light 302 projected onto side 360a. As shown, for instance, the waveguides in array 360 may be in a stack arrangement parallel to a lengthwise direction (e.g., long axis) of aperture 322 (e.g., vertically stacked between sides 360c and 360d).

As a result, the first waveguide may receive a portion of light 302 projected on side 360a and extending between cladding layers 362 and 366 (i.e., input end of the first waveguide). The first waveguide may then guide the first portion of light 302, via total internal reflection for instance, toward and out of an output end of the first waveguide (e.g., surface of core 364 at side 360b) as first diverging light portion 302a. Further, as shown, light detector array 310 may be positioned adjacent to the output end of the first waveguide to intercept and detect diverging light portion 302a. Similarly, the second waveguide can guide second diverging light portion 302b toward light detector array 316, and the third waveguide can guide third diverging light portion 302c toward light detector array 318.

As shown, each waveguide may extend vertically (e.g., parallel to a long axis of aperture 322) between sides 360c and 360d, and horizontally (e.g., parallel to a short axis of aperture 322 which points out of the page in FIG. 3B) between side 360e and another side of array 360 opposite to side 360e. Further, as shown, each waveguide may reduce divergence (e.g., due to reflection of guided light at the cladding layers, etc.) in a stacking direction (e.g., vertically) of the waveguides, while allowing a greater extent of divergence in a direction perpendicular to the stacking direction (e.g., horizontally). As a result, for instance, array 360 may prevent overlap between respective diverging light portions 302a, 302b, 302c guided in the adjacent waveguides while increasing the respective detection areas at the light detector arrays relative to a cross-sectional area of aperture 322.

Further, with this arrangement, system 300 can capture a multi-pixel image of the scene by detecting light portions incident on each light detector array 310, 316, 318 separately and simultaneously. As shown, for instance, each output from a light detector array (310, 316, or 318) may correspond to an image pixel of a vertical arrangement of pixels representating the scene. Further, the image pixel is detected over a larger cross-sectional area than a cross-sectional area of a portion of light 302 entering a respective input end. As such, for example, waveguide array 360 can be employed as an optical diffuser that distributes the power density of light 302 transmitted through aperture 322 among the various light detector arrays.

In some scenarios, the guided light portions may leak to an adjacent waveguide. In the first waveguide by way of example, such leakage may be due to an angle of incidence of the guided light at an interface between cladding 366 and core 364 approaching the critical angle. As a result, guided light in the first waveguide may potentially leak through cladding 366 as an evanescent field evanescing toward the second waveguide. To mitigate this leakage, as shown, absorbing layer 368 includes an absorber (e.g., carbon black) that has a suitable thickness to absorb the evanescent field evanescing from the first waveguide and/or the second waveguide. Similarly, absorbing layer 378 may be configured to absorb evanescing light between the second and third waveguides.

In some implementations, a core of a waveguide in array 360 can be surrounded by cladding layers along all sides of the core other than the exposed input end and output end of the waveguide. For example, cladding 362 may extend around core 364 at side 360e (and an opposite side of array 360) to connect with cladding layer 366. In these implementations, the first waveguide may be configured as a non-planar waveguide that provides two-dimensional transverse optical confinement of light portion 302a guided inside the first waveguide. Alternatively, in other implementations, the core can be sandwiched between planar cladding layers along only two sides of the core. For example, cladding layers 372 and 376 may be disposed along two opposite sides of core 374 but not along side 360e (and an opposite side thereof) of array 360. Thus, in these implementations, the second waveguide may be configured as a planar waveguide that provides optical confinement in only one transverse direction of light portion 302b guided inside the second waveguide.

It is noted that the sizes, positions, and shapes of the various components and features shown in FIGS. 3A and 3B are not necessarily to scale, but are illustrated as shown for convenience in description. Further, in some embodiments, system 300 may include fewer or more components than those shown. Further, in some embodiments, one or more of the components shown can be combined, or divided into separate components.

In a first embodiment, although light detector arrays 310, 316, 318 are shown to be disposed at a distance from side 360b of waveguide array 360, one or more of light detector arrays 310, 316, 318 can be alternatively disposed on side 360b. For example, array 310 can be disposed (e.g., molded, etc.) on the output end (exposed surface of core 364) of the first waveguide, light detector array 316 can be disposed on the output end (exposed surface of core 374) of the second waveguide, and/or light detector 318 can be disposed on the output end (exposed surface of core 384) of the third waveguide.

In a second embodiment, a distance between waveguide array 360 and aperture 322 can vary. In one example, as shown, waveguide array 360 can be disposed along (e.g., in contact with, etc.) opaque material 320. Thus, for instance, input ends of the waveguides in array 360 can be substantially coplanar with aperture 322. With this arrangement, aperture 322 can be configured as a limiting aperture in one direction (e.g., parallel to long axis or lengthwise direction of aperture 322), and the input ends of the waveguides in array 360 can be configured as limiting apertures in another direction (e.g., parallel to short axis or widthwise direction of aperture 322). Further, with this arrangement for instance, waveguide array 360 can guide light portions 302a, 302b, 302c prior to divergence and/or mixing of the light portions after being transmitted through aperture 302. However, in other examples, waveguide array 360 can be alternatively positioned at a distance (e.g., gap) from opaque material 320 (and aperture 322). For instance, the outputs of light detector arrays 310, 316, 318 can be processed (e.g., via controller 250) to account for divergence/mixing of light 302 transmitted through aperture 322.

In a third embodiment, the arrangement of aperture 322 (and/or side 360a of array 360) relative to lens 330 can vary.

In one example, aperture 322 (and/or input ends of the waveguides in array 360) can be disposed along the focal plane of lens 330.

In another example, aperture 322 (and/or input ends of the waveguides in array 360) can be disposed parallel to the focal plane of lens 330 but at a different distance to lens 330 than the distance between the focal plane and lens 330. Thus, in this example, optical characteristics (e.g., focus configuration, etc.) of system 300 can be adjusted depending on an application of system 300. As such, in some instances, focused light 302 may continue converging (after transmission through aperture 322) inside waveguide 360 before beginning to diverge toward light detector arrays 310, 316, 318. In some instances, system 300 may also include an actuator that moves lens 330, opaque material 320, and/or array 360 to achieve a particular optical configuration while scanning the scene.

In yet another example, aperture 322 (and/or side 60a of array 360) can be arranged at an offset orientation relative to the focal plane of lens 330. For instance, system 300 can rotate (e.g., via an actuator) opaque material 320 (and/or array 360) to adjust the entry angle of light 302 into respective waveguides of array 360. By doing so, a controller (e.g., controller 250) can further control optical characteristics of system 300 depending on various factors such as lens characteristics of lens 330, environment of system 300 (e.g., to reduce noise/interference arriving from a particular region of the scanned scene, etc.), among other factors.

In a fourth embodiment, opaque material 320 can be omitted from system 300. With this arrangement for instance, each respective input end of the waveguides in array 360 may correspond to a respective aperture of system 300.

In a fifth embodiment, although waveguide array 360 is shown to include a plurality of waveguides vertically arranged parallel to a long axis of aperture 322, array 360 can alternatively include waveguides arranged parallel to a short axis of aperture 322 (e.g., stacked horizontally). Alternatively or additionally, waveguide array 360 may include a grid of waveguides arranged both horizontally and vertically such that system 300 can obtain a two-dimensional (2D) image of the scene.

In a sixth embodiment, although waveguide array 360 is shown as a single physical structure, the waveguides in array 360 can be alternatively implemented as separate physical structures, and the separate physical waveguides can be stacked (e.g., vertically) with absorbers 368 and 378 appropriately interposed between the various waveguides. For example, the waveguides can be implemented as glass plates that are stacked on top of one another in a stacking direction parallel to the lengthwise direction of aperture 322.

In a seventh embodiment, one or more of cladding layers 362, 366, 372, 376, 382, 386, and/or absorbers 368, 378 can be omitted.

In an eighth embodiment, the thickness of any of cladding layers 362, 366, 372, 376, 382, and/or absorbers 368, 378 can be varied between sides 360a and 360b. For example, the cladding layers (and/or the absorbers) can have a smaller thickness near side 360a relative to a corresponding thickness near side 360b (e.g., gradually increased, tapered, etc.). With such arrangement for instance, a larger extent of light 302 incident on side 360a can be projected onto the exposed surfaces of cores 364, 374, 384, and thereby guided through the waveguides in array 360 toward light detector arrays 310, 316, 318.

In a ninth embodiment, waveguide array 360 may include fewer or more than the three waveguides shown.

In a tenth embodiment, although the input ends of the waveguides in array 360 are shown to have a similar size, the input ends of the waveguides can alternatively have different sizes. By way of example, an input end of the first waveguide extending between cladding layers 362 and 366 can have a different size than an input end of the second waveguide extending between cladding layers 372 and 376. In this example, light portion 302a detected at light detector array 310 may correspond to a greater or lower range of angles scanned within a field-of-view (FOV) of system 300, compared to a range of angles scanned within the FOV and detected as light portion 302b at light detector array 316.

In an eleventh embodiment, although light detector arrays 310, 316, 318 are shown as separate physical structures, light detector arrays 310, 316, 318 can be alternatively implemented on a single physical substrate, where one or more rows of light detectors are connected to one another but not to other rows of light detectors in the single substrate.

In a twelfth embodiment, a device that controls system 300 (e.g., LIDAR device 200, etc.), can be configured to combine outputs from two or more light detector arrays to increase the detection area as well as the effective aperture size associated with the combined detected light portions. For example, outputs from arrays 310 and 316 can be combined such that a larger effective aperture size corresponding to two portions of light 302 incident on two input ends of the first and second waveguides can be achieved, as opposed to a smaller effective aperture size that corresponds to a single light portion incident on only one of the two input ends.

III. Example Methods and Computer Readable Media

Figure 4:
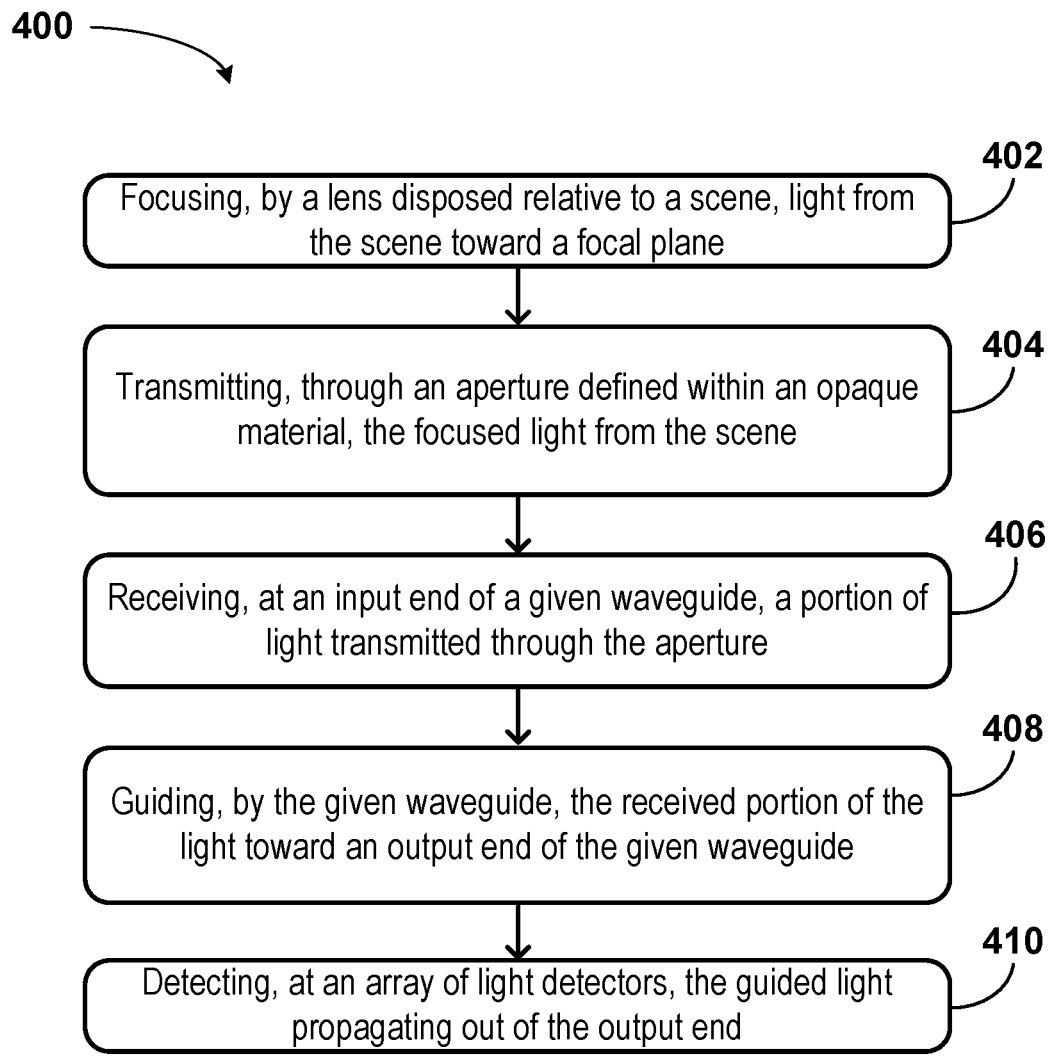
FIG. 4 is a flowchart of a method, according to example embodiments.

FIG. 4 is a flowchart of a method 400, according to example embodiments. Method 400 presents an embodiment of a method that could be used with any of systems 100, 300, and/or device 200, for example. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for method 400 and other processes and methods disclosed herein, each block in FIG. 4 may represent circuitry that is wired to perform the specific logical functions in the process.

At block 402, method 400 involves focusing, by a lens (e.g., lens 130) disposed relative to a scene, light from the scene toward a focal plane of the lens. In some examples, the light from the scene may be scattered by an object (e.g., object 104) within the scene. In some examples, a computing device (e.g., controller 250) may actuate or otherwise adjust a characteristic of the lens (e.g., focal plane, focal length, etc.).

At block 404, method 400 involves transmitting, through an aperture (e.g., aperture 122) defined within an opaque material (e.g., opaque material 120), the focused light from the scene.

At block 406, method 400 involves receiving, at an input end of a given waveguide of a plurality of waveguides, a portion of the light transmitted through the aperture.

At block 408, method 400 involves guiding, by the given waveguide, the received portion of the light toward an output end of the given waveguide.

At block 410, method 400 involves detecting, via an array of light detectors, the guided light propagating out of the output end. A cross-sectional area of the detected light may be greater than a cross-sectional area of the portion of the light received at the input end.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed is:

1. A system comprising:
a lens disposed relative to a scene and configured to focus light from the scene toward a focal plane of the lens;
an aperture defined within an opaque material, wherein the aperture is disposed along the focal plane of the lens such that at least a portion of the light from the scene focused by the lens is transmitted out of the aperture as diverging light;
a plurality of waveguides, wherein the plurality of waveguides includes a given waveguide adjacent the aperture, and wherein the given waveguide is configured to guide light from an input end of the given waveguide toward an output end of the given waveguide by total internal reflection; and
an array of light detectors that intercepts and detects at least a portion of the diverging light.

2. The system of claim 1, wherein the plurality of waveguides further includes an adjacent waveguide that is adjacent to the given waveguide, wherein the adjacent waveguide is configured to guide light from an input end of the adjacent waveguide toward an output end of the adjacent waveguide by total internal reflection.

3. The system of claim 2, further comprising an absorbing layer interposed between the given waveguide and the adjacent waveguide, wherein the absorbing layer is configured to absorb evanescent light from the given waveguide and evanescent light from the adjacent waveguide.

4. The system of claim 3, wherein the given waveguide includes a core layer and a cladding layer, and wherein the absorbing layer is disposed on the cladding layer of the given waveguide.

5. The system of claim 4, wherein the adjacent waveguide includes a core layer and a cladding layer, and wherein the absorbing layer is disposed on the cladding layer of the adjacent waveguide.

6. The system of claim 3, wherein the absorbing layer comprises carbon black.

7. The system of claim 1, wherein the array of light detectors comprises a plurality of single photon avalanche diodes (SPADs).

8. The system of claim 1, wherein the light detectors in the array are connected in parallel with one another.

9. The system of claim 1, wherein the array of light detectors is disposed on the output end of the given waveguide.

10. The system of claim 1, wherein the array of light detectors is spaced apart from the given waveguide.

11. A light detection and ranging (LIDAR) device comprising:
a LIDAR transmitter that illuminates a scene;
a LIDAR receiver that receives light scattered by one or more objects within the scene, wherein the LIDAR receiver comprises:
a lens disposed relative to the scene and configured to focus light from the scene toward a focal plane of the lens;
an aperture defined within an opaque material, wherein the aperture is disposed along the focal plane of the lens such that at least a portion of the light from the scene focused by the lens is transmitted out of the aperture as diverging light;
a plurality of waveguides, wherein the plurality of waveguides includes a given waveguide adjacent the aperture, and wherein the given waveguide is configured to guide light from an input end of the given waveguide toward an output end of the given waveguide by total internal reflection; and
an array of light detectors that intercepts and detects at least a portion of the diverging light.

12. The LIDAR device of claim 11, wherein the plurality of waveguides further includes an adjacent waveguide that is adjacent to the given waveguide, wherein the adjacent waveguide is configured to guide light from an input end of the adjacent waveguide toward an output end of the adjacent waveguide by total internal reflection.

13. The LIDAR device of claim 12, further comprising an absorbing layer interposed between the given waveguide and the adjacent waveguide, wherein the absorbing layer is configured to absorb evanescent light from the given waveguide and evanescent light from the adjacent waveguide.

14. The LIDAR device of claim 13, wherein the given waveguide includes a core layer and a cladding layer, and wherein the absorbing layer is disposed on the cladding layer of the given waveguide.

15. The LIDAR device of claim 14, wherein the adjacent waveguide includes a core layer and a cladding layer, and wherein the absorbing layer is disposed on the cladding layer of the adjacent waveguide.

16. The LIDAR device of claim 13, wherein the absorbing layer comprises carbon black.

17. The LIDAR device of claim 11, wherein the array of light detectors comprises a plurality of single photon avalanche diodes (SPADs).

18. The LIDAR device of claim 11, wherein the light detectors in the array are connected in parallel with one another.

19. The LIDAR device of claim 11, wherein the array of light detectors is disposed on the output end of the given waveguide.

20. The LIDAR device of claim 11, wherein the array of light detectors is spaced apart from the given waveguide.

* * * * *